VAPOR DEPOSITION APPARATUS INCLUDING AIR MASK

Original Filed Nov. 4, 1969 4 Sheets-Sheet 1

INVENTORS
BENGT O. AUGUSTSSON
BY RUSSELL D. SOUTHWICK
Kenyon & Kenyon
ATTORNEYS

VAPOR DEPOSITION APPARATUS INCLUDING AIR MASK

Original Filed Nov. 4, 1969 4 Sheets-Sheet 2

INVENTORS
BENGT O. AUGUSTSSON
BY RUSSELL D. SOUTHWICK
Kenyon & Kenyon
ATTORNEYS

VAPOR DEPOSITION APPARATUS INCLUDING AIR MASK

Original Filed Nov. 4, 1969 4 Sheets-Sheet 3

INVENTORS
BENGT O. AUGUSTSSON
BY RUSSELL D. SOUTHWICK
Kenyon & Kenyon
ATTORNEYS

VAPOR DEPOSITION APPARATUS INCLUDING AIR MASK

Original Filed Nov. 4, 1969 4 Sheets-Sheet 4

INVENTORS
BENGT O. AUGUSTSSON
RUSSELL D. SOUTHWICK
BY Kenyon & Kenyon
ATTORNEYS

United States Patent Office

Re. 28,076
Reissued July 16, 1974

28,076
VAPOR DEPOSITION APPARATUS INCLUDING AIR MASK

Bengt O. Augustsson, Surte, Sweden, and Russell D. Southwick, Butler, Pa., assignors to Glass Container Manufacturers Institute, Inc., New York, N.Y.

Original No. 3,688,737, dated Sept. 5, 1972, Ser. No. 873,916, Nov. 4, 1969. Application for reissue Aug. 24, 1973, Ser. No. 391,036
Int. Cl. C23c *13/08*
U.S. Cl. 118—48 4 Claims

Matter enclosed in heavy brackets [ ] appears in the original patent but forms no part of this reissue specification; matter printed in italics indicates the additions made by reissue.

ABSTRACT OF THE DISCLOSURE

Vapor deposition means in combination with means to deliver an air stream adjacent to the vapor stream whereby to mask predetermined portions of a substrate. Separate exhaust means are opposed to the respective coating and masking streams. Means convey the substrate between the opposed delivery and exhaust means.

Figure 1:
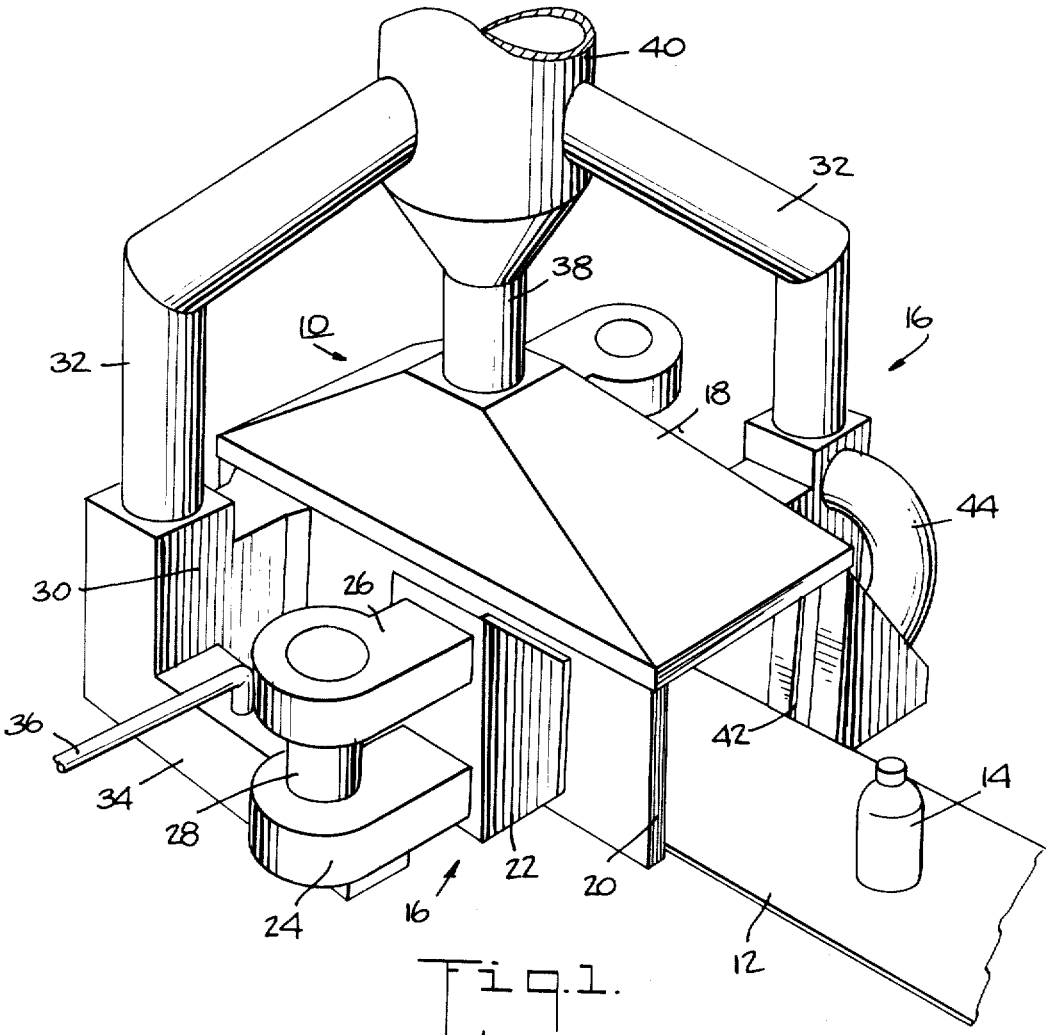

This invention relates to apparatus for applying inorganic coatings to glassware. More particularly, this invention is concerned with apparatus for applying a metal oxide coating, such as a tin or titanium oxide coating, to glass bottles and other glass containers.

It has long been known that glass can be provided with an "iridescent" coating by directing a vapor stream of a thermally decomposable metal compound, such as titanium or tin tetrachloride, against the surface of glassware maintained at elevated temperatures, whereby the metal compound decomposes to form a metal oxide coating which, if thick enough, reflects sufficient light to cause the glassware to appear more or less iridescent. An early technique is disclosed by Lyle in U.S. Pat. No. 2,375,482.

More recently it has been discovered that such inorganic coatings, if applied to virgin glass shortly after molding and before annealing has occurred, can cause a substantial increase in the scratch resistance imparted by and the permanency of a second coating of a lubricious organic material which is applied to the glassware after annealing. Such composite coatings are of particular interest for non-returnable beverage bottles.

For such use, however, it is desired that the "iridescent" effects be avoided. Thus, in the case of tin oxide coatings the thickness must be less than about 120 Angstroms and titanium oxide coatings must be less than 90 Angstroms in thickness. On the other hand, the metal oxide coating must be at least 15 to 20 Angstroms thick before any improvement in scratch resistance and permanency is observed in the composite coating, and at least 40 Angstroms thick to achieve maximum scratch resistance and permanency. Thus it can be seen that the thickness of the metal thickness must be maintained within rather narrow limits. The magnitude of this problem is compounded by the need to maintain a high degree of uniformity and reproducibility, not only on each item of glassware but also from one item to the next. In addition, when bottles are being treated, it has been found necessary to keep the metal oxide coating off of the finish to avoid corrosion of bottle caps. Until the present invention, however, there has been no apparatus capable of providing the high degree of control essential to the achievement of uniformity and reproducibility of coating thickness while avoiding deposition of a coating on the finish of bottles.

It is an object of this invention to provide an improved apparatus for applying metal oxide coatings to glassware.

A further object of this invention is to provide such apparatus whereby a high degree of coating uniformity, both on each item and from item to item, is obtained.

Still another object is to provide apparatus for applying such coatings which is simple to operate and service.

Another object is to provide an apparatus for applying an inorganic coating to the sides, but not the finish of beverage bottles.

A still further object is to provide an apparatus for applying such coatings which reduces or eliminates the escape of fumes from the working area.

Still other objects will be apparent from the ensuing specification, the drawings and claims.

In general, the apparatus of the present invention comprises a chamber for applying an inorganic coating to series of glass containers, typified by beverage bottles, especially non-returnable bottles, being carried through the chamber on a suitable conveyor. The chamber comprises two opposed side unit disposed adjacent to and longitudinally of the conveyor and a top. Each side unit includes a positive pressure gas outlet and a gas intake, each outlet and intake being desirably divided into a lower, or vapor laden air section and an upper, or substantially vapor-free air section, as well as means for circulating vapor laden air from the intake to the outlet, and means for introducing vapor into the circulating vapor laden air. The units are so constructed and disposed about and along the conveyor that the forced air discharged from the gas outlet of each unit is directed into the intake of the opposed unit, thus providing, in essence, a closed vapor circuit. In addition to the vapor circuit, each unit includes means for introducing vapor-free air at positive pressure through said air outlet and means for exhausting air after a single traverse of the chamber.

By the word "vapor," as employed herein, is meant the vaporized metal compound which is applied to the glassware to form the metal oxide coating. This compound preferably is tin tetrachloride, although other metal compounds known to be useful also can be employed. For example, titanium tetrachloride, tetraisopropyl titanate, and a variety of other inorganic and metallo-organic compounds have been employed in the past to provide metal oxide coatings on glassware. In the following discussion specific reference will be made to tin tetrachloride, but it is to be understood that other metal compounds may be substituted therefor.

Figure 7:
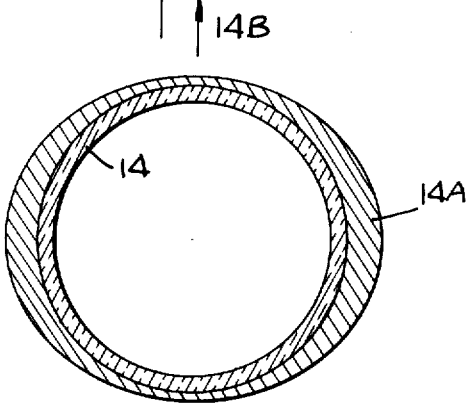
Figure 2:
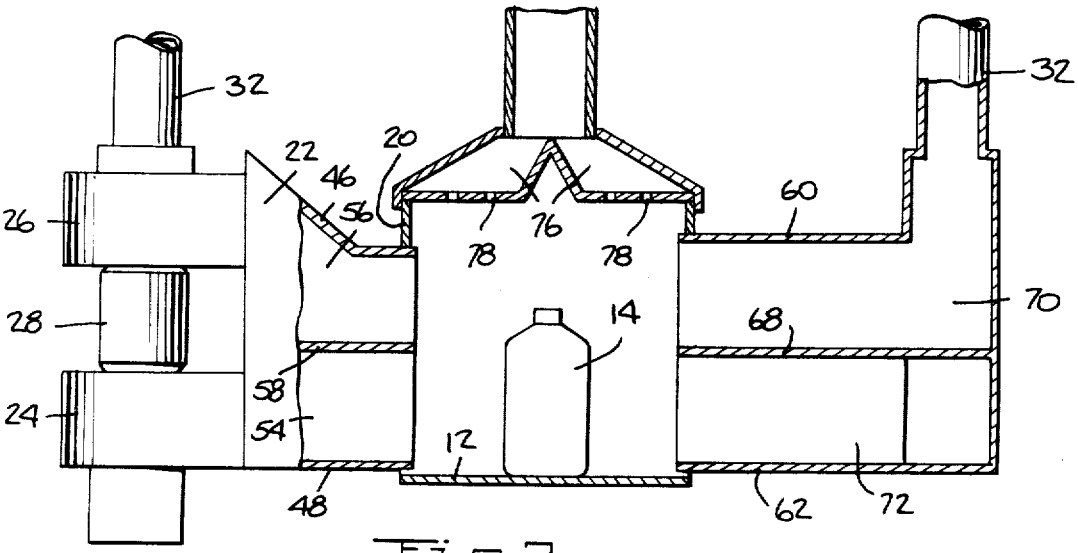
Figure 3:
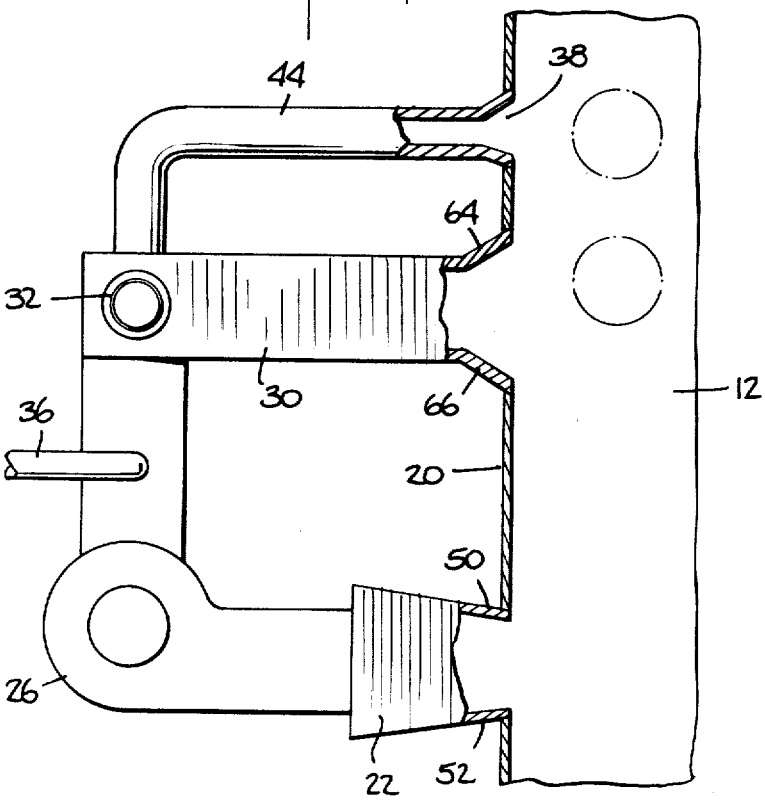
Figure 4:
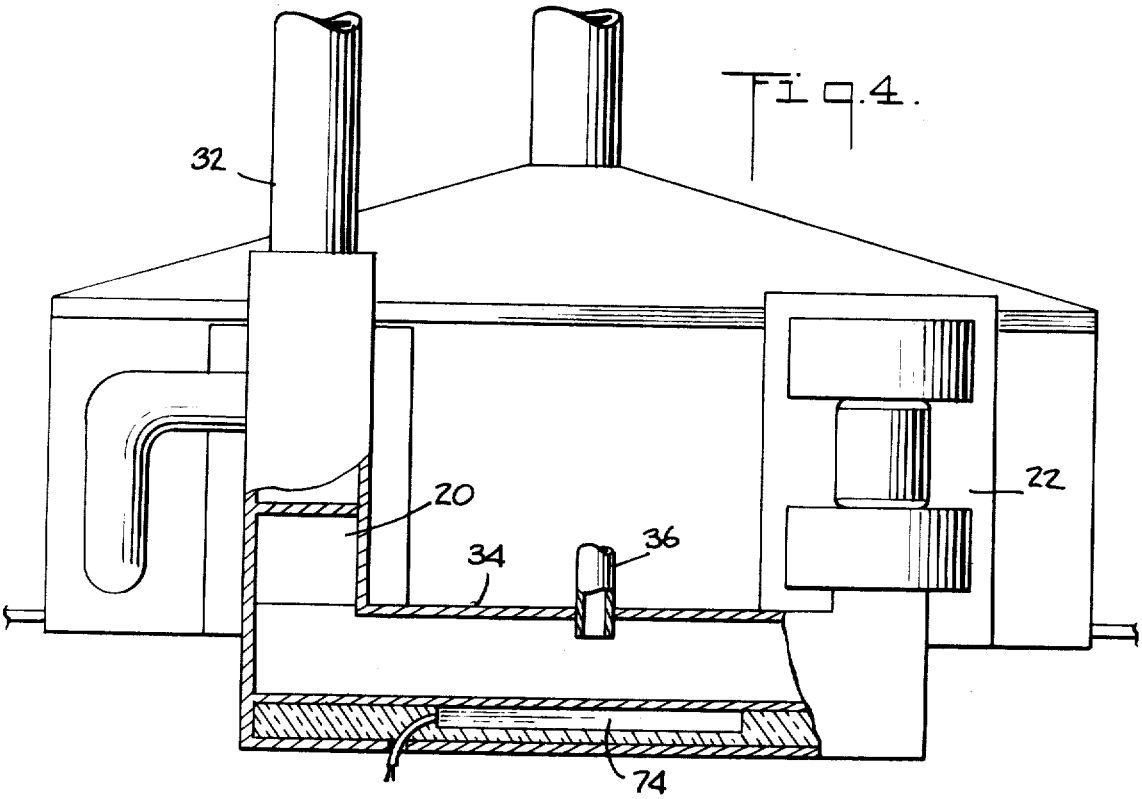
Figure 5:
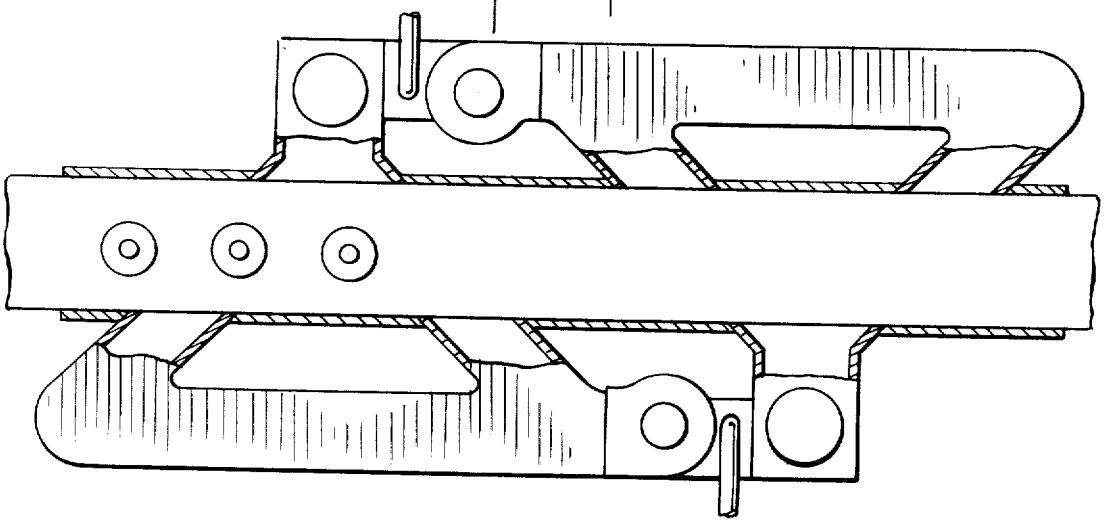
Figure 6:
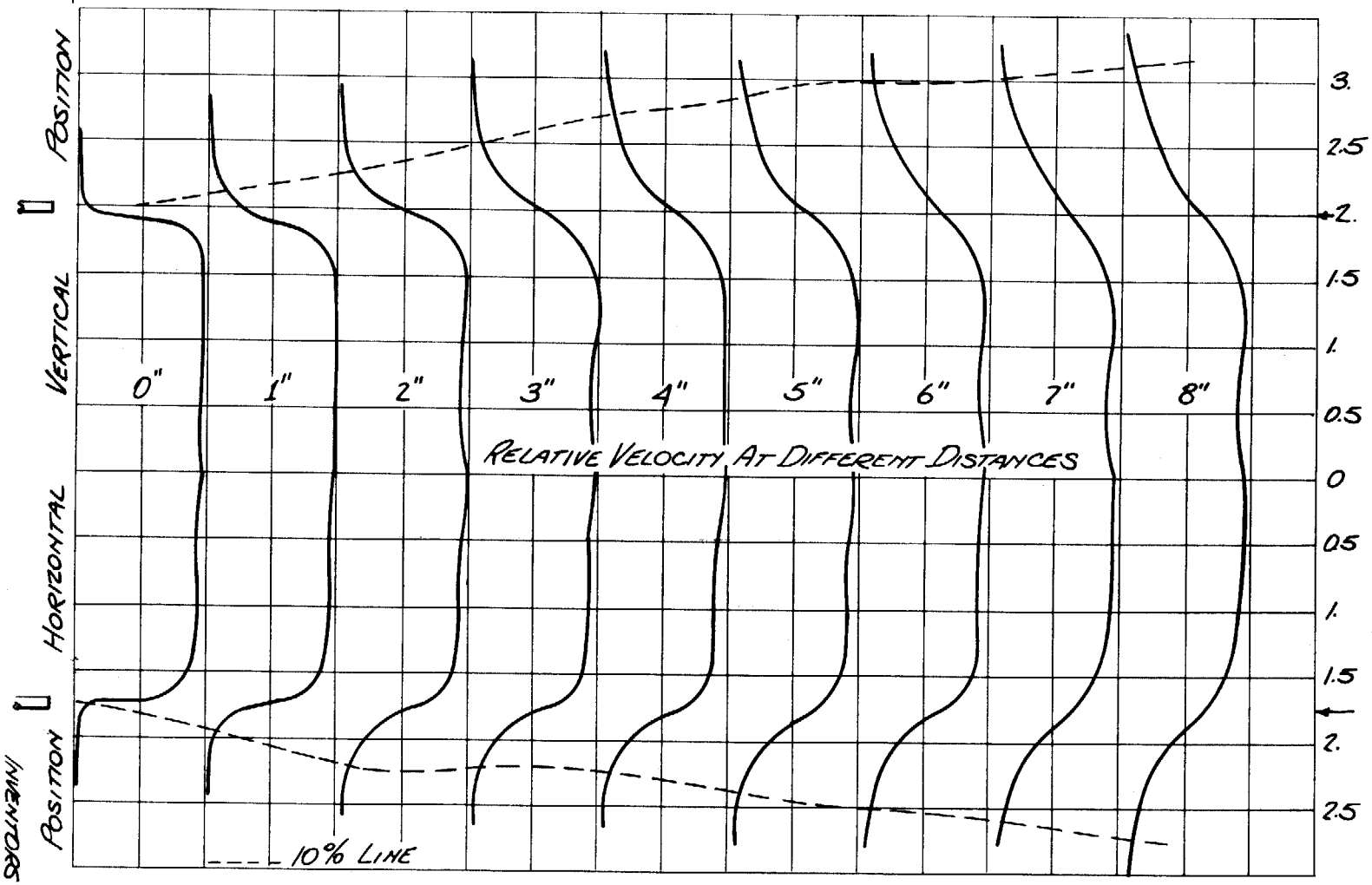

The apparatus is illustrated in the drawings of which:

FIG. 1 is a perspective view of one form of the apparatus of this invention,

FIG. 2 is an end view, partly in cross-section, of the apparatus shown in FIG. 1, FIG. 3 is a partial plan view, partly in cross-section, of the apparatus shown in FIG. 1, FIG. 4 is a side elevation partly in cross-section, of the apparatus of FIG. 1, FIG. 5 is a partial plan view, partly in cross-section of a modified form of the apparatus of FIG. 1, FIG. 6 is a graphical representation of the relative air velocities in the vapor stream in the apparatus of this invention, and FIG. 7 is a cross-sectional view of a bottle treated in the apparatus of FIG. 1.

With reference to FIG. 1, the apparatus of this invention comprises enclosure 10 disposed over and along generally horizontal conveyor 12 adapted to carry bottles 14 therethrough in single file. Enclosure 10 is composed of identical side units 16, 16 surmounted by hood 18. Each side unit comprises sidewall 20, a positive pressure gas outlet system comprising gas outlet 22, blowers 24 and 26 driven by motor 28, a gas intake system comprising intake 30 and exhaust stack 32, and a vapor circulation system including duct 34 and vapor feed line 36.

The enclosure is desirably provided with auxiliary exhaust means to minimize the escape of vapors. For example, hood 18 is provided with exhaust duct 38 which, together with stacks 32, communicates with duct 40, and each side unit is provided with vertical exhaust port 42 communicating through duct 44 with stack 32 to draw off fumes which might otherwise escape removal through intake 30.

With further reference to FIGS. 2 and 3, gas outlet 22 comprises a duct of generally rectangular cross-section having top 46, bottom 48 and sidewalls 50 and 52. Outlet 22 is subdivided into lower, or vapor outlet passage 54 and upper, or vapor-free air outlet passage 56, by generally horizontal partition 58. The outer edge of partition 58 is at a level not higher than the shoulder of bottle 14, and desirably not more than one-fourth inch below the shoulder. Partition 58 may be fixed or may be adjustable to permit use of the apparatus of this invention for the treatment of bottles of varying design. It is generally impractical, however, to provide sufficient adjustability to partition 58 to handle bottles of widely varying shoulder heights such as 12 ounce and quart bottles.

Still referring to FIGS. 2 and 3, gas intake 30 is a duct of generally rectangular cross-section having top 60, bottom 62, and sides 64 and 66. Like outlet duct 22, intake 30 is provided with generally horizontal partition 68, thus subdividing outlet 30 into upper, or substantially vapor free air intake 70 and lower, or vapor intake 72. Partition 68 is at approximately the same level as partition 58 or somewhat lower, and may also be adjustable but this is not necessary.

Vapor intake 72 discharges into duct 34, which also communicates with the intake of blower 24, which in turn discharges into vapor outlet 54. To minimize the loss of vapors, the cross-sectional dimensions of intake 30 at wall 20 are larger than those of outlet 22 at wall 20, and are sufficiently large that the major portion, and preferably at least about 90 percent of the stream discharged through outlet 22 passes into intake 30.

Vapors are introduced into the vapor circuit through tube 36 in duct 34 at a point upstream from blower 24. In this way blower 24 acts as a mixer and assures uniform vapor concentration in the vapor stream passing over conveyor 12. In the preferred form, as best shown in FIG. 4, vapor tube 36 discharges downwardly into duct 34. The source of the vapors is in no way critical to the present invention, but the vapor stream introduced through tube 36 is desirably dry air saturated with tin tetrachloride or other metal compound such as is obtained by bubbling dry air through or passing dry air over the surface of liquid tin tetrachloride in known manner.

It has been found desirable that all surfaces in the vapor circuit be at a temperature greater than about 180° F. to minimize deposition of tin oxides and formation of hydrogen chloride. Accordingly, the circuit is provided with means to heat the circulating air. In a preferred embodiment as illustrated in FIG. 4, a heater such as electric heater 74 is provided in the bottom of duct 34 opposed to the opening of tube 36.

From the foregoing it will be seen that the apparatus of this invention comprises two air systems. The first is the closed vapor circuit, wherein vapor laden air is directed through a vapor outlet across a conveyor in a generally horizontal direction and onto the bottles riding on the conveyor, recovered in an opposed intake admixed with make-up vapor and circulated via a blower back across the conveyor through an outlet at a point spaced along the conveyor.

The second air system is the fresh or ambient air system wherein ambient, vapor-free air is drawn in through the intake ports of a blower, directed across the conveyor in a parallel superposed relationship with the vapor laden stream and, together with various exhaust streams, vented. Thus this system is a single pass, non-cyclic system.

Finally, the apparatus is provided with an auxiliary exhaust system including vertical slots 42 in each of sidewalls 20 adjacent intake 30 and located between intake 30 and the end of wall 20, which communicate with exhaust stacks 32 through conduits 44. In a preferred form shown in FIGS. 1 and 2, hood 18 is provided with downwardly diverging channels 76 having openings 78 in the bottom thereof, whereby air is drawn off along the junctures of hood 18 and walls 20.

A particularly important feature of the present invention is the design of the vapor circuit, and more particularly the outlet and intake portions thereof, to assure a uniform concentration of vapor in the stream in contact with the glassware being treated and thus a uniform coating thickness on the glassware regardless of lateral position on the conveyor. Such uniformity is attained through the use of a generally rectangular cross-section and means to minimize divergence of the vapor stream after discharge through outlet 22. In particular, it has been found that the lateral dimensions of the vapor stream, as measured at the 10 percent velocity boundary, should not increase by more than 50 percent, and preferably not more than 35 percent, of the length of the stream from the outlet. This concept is illustrated in FIG. 6, which is a plot of relative air velocities at distances of up to 8 inches from a vapor outlet having a height of 4 inches and a width of 3½ inches, at a maximum velocity of 10 feet per second.

In preparing the plots the vapor stream was traversed, both horizontally and vertically in known manner to measure velocity, and velocities from the center to the sidewalls are plotted in the bottom portion, and those from the centerline to the top are plotted in the top half. In each instance, points at which the air velocity is 10 percent of the maximum velocity are connected by a dotted line to provide the 10 percent velocity boundary.

As can be seen from FIG. 6, as the length of the stream, as measured from the outlet, increases the stream tends to diverge, as shown by the divergence of the 10 percent velocity boundary, and the edges of the curve of the velocity profile tend to level off. At a distance of 6 inches from the outlet, the dimensions of the 10 percent boundary are about 6 inches by 5 inches, representing an increase of 2 inches in height or about 0.3 inch/inch of stream length, and 1.5 inches in width, or about 0.25 inch/inch of stream length.

To achieve such minimum divergence, the vapor outlet is tapered toward its outlet. The degree of taper is not highly critical, but ordinarily will be in the range of from about 2° to about 10°, with a 5° taper being presently preferred. Such tapering is not required, however, where other means are present which prevent divergence of the air stream. Thus, no taper is required in the bottom of the outlet because the conveyor belt surface prevents dispersion of the bottom of the stream. Similarly, when the superposed vapor free air stream is in use it tends to prevent dispersion of the top boundary of the vapor laden stream, thus rendering a tapering of the top wall of vapor outlet 54, i.e., partition 58, unnecessary. It is, however, permissable but not essential to provide a downward taper to the top of vapor-free air outlet 56.

The design of the intake, while less critical, should be such that the intake is large enough to accept the air streams from the opposed outlet, and should have outer dimensions at least as large as the 10 percent boundary of the air stream at the side wall. Thus, at a distance of 6 inches from the outlet described with reference to FIG. 6, the intake should have dimensions of at least 6 by 5 inches. The height of central partition 68 is desirably about that of the partition in the opposed outlet, but is preferably slightly, e.g., up to about one-half inch, lower than partition 58 to avoid introduction of the moist ambient air of the superimposed ambient air stream into the vapor circuit. Thus a minor portion of the vapor laden air passes into outlet 56.

It has also been found that vapor velocity is quite important to achieving good bottle to bottle reproduceability of the inorganic coating. That is, the rate should be sufficiently high in relation to the speed of the glassware that the stream rapidly restabilizes to form a steady stream after passage of a bottle through it, thus providing a uniform, undisturbed stream for the succeeding bottle, and yet not so high that the bottles are moved laterally on the conveyor by impingement of the stream on the bottle. In general, and when the stream is at right angles to a conveyor travelling at commonly employed rates and bottle spacings, e.g., about 0.8 to about 1.5 feet per second, and center-to-center bottle spacings of about 1.5 to about 2 diameters, the vapor stream should have a linear velocity of about 5 to 10 times that of the speed of the conveyor. In general, a gas velocity in the range of from about 5 to about 15 feet per second has been found useful, with a velocity of about 10 feet per second being presently preferred. At such velocities the vapor stream restabilizes almost instantaneously.

The velocity of the vapor-free air stream is also important in preventing upward divergence of the vapor laden air stream and deposition of organic coating on the bottle finish. In general, the velocity of this stream should be greater than that of the vapor stream, and normally in the range from about 1.2 to about 2.5 times that of the vapor stream. A velocity of from about 1.5 to about 2.0 times that of the vapor stream is presently preferred.

It is within the contemplation of the present invention that the gas outlet system, i.e., the blowers, their associated motor and the vapor and air outlet assembly, be a removable unit. Thus in the event of an equipment breakdown the faulty unit may be removed and another inserted, thereby minimizing down time. In addition, a series of units designed to coat bottles of varying [should] *shoulder* heights may be employed to facilitate conversion of the hood from one size bottle to another. This is readily accomplished through a gas outlet subassembly as shown in FIG. 1 comprising a removable wall panel 20 having affixed thereto duct 22, blowers 24 and 26 and motor 28.

The apparatus shown in FIGS. 1–4 has only two vapor outlets, and from the standpoint of simplicity and compactness is preferred. However, the coating on the bottle is not as uniform as might be desired. In particular, and especially when titanium oxide coating is being applied, maintenance of tolerances in a two-outlet system is difficult because the thickness of the coating varies with the distance from the vapor outlet. That is, the thickest coatings normally form on the bottle surface closest to the outlets, as is shown in exaggerated fashion in FIG. 7, which is across-sectional view of bottle 14 with metal oxide coating 14A travelling in the direction of arrow 14B. The degree of this variation can be minimized by the use of more than two vapor outlets, with the most satisfactory number being four, each outlet directing the air stream at about a 45° angle to the conveyor belt as shown in FIG. 5. In this embodiment each side unit comprises two outlets, one directing the air flow generally in the direction of conveyor travel and the other generally opposed to the direction of conveyor travel. To avoid undesirable disturbance of the air stream, the outlets of one side unit should be so spaced that the air streams do not intersect at any point over the conveyor. Although the streams may diverge, it is preferred that they converge at a point on the opposed sidewall so that a single outlet may be employed as shown in FIG. 5.

In still a further embodiment hood 18 is rotatably attached to duct 38 to facilitate access to the portion of the conveyor within enclosure 10 in the case of breakage, jamming or other mishap, and to facilitate periodic clearing of intake 30. It is also desirable to provide a longitudinal slot, a series of ports, or other means along the juncture of hood 18 and wall 20 to allow ambient air to be drawn into and up through hood 18 and ducts 38 and 40, thus further minimizing the escape of fumes from the chamber.

It will be readily seen that the present invention provides a means for applying a uniform metal oxide, especially tin oxide, coating to beverage bottles while minimizing metal oxide deposits on the bottle finish. In particular, the rectangular cross-section and non-divergent form of the vapor stream assures uniform vapor concentration across the conveyor, and thus provides a uniform coating regardless of the lateral position of the bottle on the conveyor; the positive-pressure, high velocity vapor stream assures bottle-to-bottle coating uniformity; the use of a plurality of vapor outlets facilitates uniformity of coating thickness on each bottle, and the superimposed vapor stream minimizes metal oxide deposition on the finish.

What is claimed is:

1. Apparatus for applying a metal oxide coating to glassware travelling on a conveyor comprising opposed units positioned along and longitudinally of said conveyor, each of said units including two laterally displaced first outlet means comprising generally rectangular ducts having convergently tapering sidewalls for forming positive pressure, substantially non-divergent, generally rectangular streams of air containing a vapor of *at least one of an inorganic metallic compound and* an organometallic compound which thermally decomposes to form a metal oxide transverse to said conveyor, second outlet means above and adjacent to each of said first outlet means for forming vapor-free air streams parallel to and superimposed over said vapor-containing air streams, a laterally displaced first intake means for recovering a portion of the positive pressure vapor-containing streams from the opposed unit, a second intake means above said first intake means for recovering said vapor-free air streams, and means for recycling the vapor stream recovered by said first intake to said first outlet, said units being so positioned that the streams discharged from the outlet means of one unit are at an angle of about 45° to the direction of the conveyor and feed into the single intake of the opposed unit.

2. Apparatus for applying a metal oxide coating to glassware travelling on a conveyor comprising opposed units positioned along and longitudinally of said conveyor, each of said units including a first outlet means comprising a generally rectangular duct having convergently tapering sidewalls for forming a positive pressure, substantially non-divergent, generally rectangular stream of air containing a vapor of *at least one of an inorganic metallic compound and* an organometallic compound which thermally decomposes to form a metal oxide transverse to said conveyor, a second outlet means above and adjacent to said first outlet means for forming a vapor-free air stream parallel to and superimposed over said vapor-containing air stream, a laterally displaced first intake means for recovering a portion of the positive pressure vapor-containing stream from the opposed unit, a second intake means above said first intake means for recovering said vapor-free air stream, and means for recycling the vapor stream recovered by said first intake to said first outlet, said units being so positioned that the air streams discharged from each unit feed into the intakes of the opposed unit.

3. Apparatus according to claim 2 wherein the taper is in the range of from about 2° to about 10°.

4. Apparatus according to claim 3 wherein said taper is about 5°.

References Cited

The following references, cited by the Examiner, are of record in the patented file of this patent or the original patent.

UNITED STATES PATENTS

| | | | |
|---|---|---|---|
| 3,424,129 | 1/1969 | Peeps et al. | 118—326 X |
| 3,438,803 | 4/1965 | Dubble et al. | 118—48 X |
| 3,494,324 | 2/1970 | Bauer et al. | 118—63 X |
| 3,516,811 | 6/1970 | Gatchet et al. | 118—323 X |
| 3,561,940 | 2/1971 | Scholes | 118—49 X |
| 2,072,948 | 3/1937 | Geffs | 118—326 X |
| 2,295,928 | 9/1942 | Bower | 118—326 X |

| | | | |
|---|---|---|---|
| 2,418,055 | 3/1947 | Smith, Jr. et al. | 118—48 |
| 2,519,177 | 8/1950 | Chenault | 118—326 X |
| 2,560,047 | 7/1951 | York et al. | 118—312 |
| 2,721,535 | 10/1955 | Zitkus | 118—301 |
| 2,736,289 | 2/1956 | Allen | 118—48 |
| 2,953,483 | 9/1960 | Torok | 118—48 X |
| 3,045,273 | 7/1962 | Bruno | 15—306 A |
| 3,172,780 | 3/1965 | Csok et al. | 118—50 |
| 3,208,868 | 9/1965 | Storbel et al. | 118—326 X |
| 2,295,928 | 9/1942 | Bower | 118—326 X |

MORRIS KAPLAN, Primary Examiner

U.S. Cl. X.R.

118—58